United States Patent [19]
Joshi

[11] Patent Number: 5,532,204
[45] Date of Patent: Jul. 2, 1996

[54] FOLIAR-APPLIED METHANOL AND NITROGEN FOR INCREASED PRODUCTIVITY ON LEGUMINOUS PLANTS

[75] Inventor: Jagmohan Joshi, Salisbury, Md.

[73] Assignee: University of Maryland Eastern Shore, Princess Anne, Md.

[21] Appl. No.: 334,020

[22] Filed: Nov. 2, 1994

[51] Int. Cl.$^6$ .............................. A01N 31/02; C05C 9/00
[52] U.S. Cl. .......................... 504/118; 504/148; 504/353; 71/28
[58] Field of Search .................................. 504/118, 148, 504/353; 71/28

[56] References Cited

U.S. PATENT DOCUMENTS

| | | | |
|---|---|---|---|
| 4,297,130 | 10/1981 | Moore | 504/327 |
| 4,517,003 | 5/1985 | Kolc et al. | 71/28 |
| 5,188,654 | 2/1993 | Manalastas et al. | 71/28 |
| 5,268,171 | 12/1993 | Polacco et al. | 424/93 |

OTHER PUBLICATIONS

Nonomura et al., "the Path of Carbon In Photosynthesis: Improved Crop yield with Methanol" Proceedings of National Academy of Sciences, USA, 89, 9794–98, 1992.

Nishio et al., "Physiological Aspects of Methanol Feeding to Higher Plants", L. Ferguson ED Proceedings of 20th Annual Plant Growth Regulator Soc. of America, pp. 8–13, 1993.

Fehr et al., "Stages of Soybean Development", Iowa State University Press: Ames, Iowa, 1977.

Holland et al. "PPFMs and Other Covert Contaminants . . ." Ann. Rev. Plant Physiol. Plant Mol. Biol. 45:197–209. 1994.

Primary Examiner—S. Mark Clardy
Attorney, Agent, or Firm—Christopher N. Sears

[57] ABSTRACT

The invention pertains to a method for increasing the seed yield of leguminous plants in general and soybeans in particular by a foliar-applied fertilization method at an R5 seed growth stage for soy bean plants and the pod growth stage in other leguminous plants. The method requires spraying the leguminous plants with a methanol solution that is up to 50% of a water based solution; then subsequently or concurrently applying a urea based nitrogen fertilizer at 25–50 pounds/acre. Other leguminous plants which the method used therewith includes peanuts, peas and beans.

9 Claims, No Drawings

FOLIAR-APPLIED METHANOL AND NITROGEN FOR INCREASED PRODUCTIVITY ON LEGUMINOUS PLANTS

BACKGROUND OF THE INVENTION

1. Field of the Invention

This invention relates to a method of fertilizing leguminous plants for increased yield using methanol and urea based nitrogen fertilizer.

2. Description of the Prior Art

Legumes constitute some of the world's most important agricultural crops. Examples include peas, beans, peanuts and soybeans. Leguminous plants are characterized by their ability to fix nitrogen microbially from the atmosphere, usually in nodules connected to their root systems, and their ability to use fixed nitrogen to produce proteinaceous seeds. The commercial products from leguminous plants are primarily seeds enclosed in true pods which are generated from the plants' flowers. Few of the flowers of these plant are normally converted to seed pods. Most flowers are aborted because of the inability of the plant to supply the nutrients required during period of stress when flowers are converted to mature seed pods among other reasons. Another critical stage in the development of this type of plant is the seed formation stage within the pods of these plants. In soybeans, this is the R5 stage.

A soybean plant's (e.g. Glycine max L. Merr.) growth and yield are dependent on many factors including environment, management and physiological changes that occur during its reproductive growth stages as taught by Gardner et al. article "Physiology of crop plants", Iowa State University Press: Ames, Iowa 1985. Earlier studies suggested that soybean like most other C3 plant species, has a lower photosynthetic ability than C4 plants in Hartman et al.'s article "Photosynthesis, respiration and translocation", pp. 145–167 in *Plant Science: Growth, Development and Utilization of Cultivated Plants*, 2nd ed. Prentice Hall, N.J., U.S.A.1988. Under optimum conditions of light, nutrients, favorable temperature, adequate moisture and atmospheric $CO_2$, the photosynthetic capacity of soybean declines with increased demand for photosynthates during reproductive growth stages, see Gay et al.'s article "Physiological aspects of yield improvement in soybean", Agron. J., 72:387–391, 1980. It was further suggested that during flowering and pod-filling stage, vegetative and reproductive organs compete for photosynthates and nitrogen. It has also been reported that during R5 (beginning pod fill and seed growth), R6 and R7 reproductive growth stages, carbohydrates and nitrogen are redistributed from vegetative parts to seed development. These developmental growth stages are well known and defined in Fehr et al.'s article "Stages of Soybean Development", Iowa State University Press: Ames, Iowa 1977. Furthermore, the length of effective pod-filling period correlated with soybean yield. Some studies with $CO_2$ enrichment and foliar application of nitrogen contributed to significant yield increases and the increased yield was attributed to the extended effective pod-filling period.

Nonomura et al.'s article "The path of carbon in photosynthesis: Improved crop yield with methanol", Proceedings of National Academy Science, U.S.A., 89, 9794–9798 1992, reported that foliar sprays of aqueous (10–50%) methanol increased growth and yield of C3 crop plants in arid environments. C3 is defined as plants that fix $CO_2$ by forming (3-carbon acid), i.e. 3-phosphoglyceric acid. This article teaches in general of plants such as wheat (Triticum durum), cotton (Gossypium hirsutum), eggplant (Solanum melongena) and tomato (Lycopersicon esculentum) that are treated with nutrient-supplemented methanol that resulted in up to 100% increase in yield. This teaching further suggests that the effect of foliar methanol on growth was far beyond that expected of any foliar nutrient. This article goes on and suggest that the use of carbon from methanol was more reactive and easily metabolized by these plants as compared to $CO_2$ enriched environment to enhance photosynthesis. Additionally, this article reported that urea fertilizer was applied along with methanol to maintain acceptable carbon/nitrogen ratios. Use of urea nitrogen with methanol suggested that nitrogen was vital to the assimilation and fixation of carbon. However, this article does not suggest or teach of: i) a foliar fertilization method for leguminous plants with critical amounts to be applied during a critical R5 growth stage in soybean plants or seed development stage in other leguminous plants as required by the instant invention; ii) optimal percentages of methanol and nitrogen fertilizer to be applied to leguminous plants for optimal yield; and iii) the synergistic effect of the proper amounts of fertilizer that must be applied at the leguminous plant's seed growth stage.

Another article related to the use of methanol with fertilizer is Nishio et al. article "Physiological aspects of methanol feeding to higher plants" In L. Ferguson (Ed.) Proceedings of twentieth annual meeting Plant Growth Regulator Society of America, pp. 8–13 1993; the teaching discusses a 30% increase in dry matter weight and accelerated rate of development of soybean plant with foliar-applied 15% methanol with fertilizer on a daily rotated basis. This teaching is concerned with the inherent vegetative growth of the plant in general, not the actual seed yield as is the purpose of the instant invention. This teaching does not teach or suggest of: i) a fertilization method at a critical R5 growth stage of a soybean plant in particular or the seed forming stage in other leguminous plants; ii) a synergistic effect of the instant invention's method of foliar-applied methanol and fertilizer at a critical seed growth stage of a leguminous plant and the optimal amounts of fertilizer as taught by the instant invention.

Another teaching recently reported that use of methanol alone without additional fertilizers on plants such as wheat or corn does not increase yield, see Radin's brief article "No yield boost from methanol", Agricultural Research, p. 19, 1994.

other teachings where urea fertilizer was primarily used alone on soybean plants includes Hanway's article "Foliar fertilization of soybeans during seed-filling", In F. T. Corbin (Ed.) World Soybean Research Conference II: Proceeding 409–416, 1979. This article teaches of significant yield increases occur when foliar fertilization of soybean with urea at the pod-filling R3 and R4 stages. This teaching also suggest that foliar nitrogen stimulated leaf activity, lengthened the effective pod-filling period, prevented early defoliation and senescence but did not increase the rate of photosynthesis.

Soybean yield increase has also been obtained from using urea as a source of nitrogen by foliar fertilization between various stages of the soybean plant growth, see i) Watanabe et al. article "Response of soybean to supplemental nitrogen after flowering", In S. Shanmugasundaram and E. W. Sulzberger (Eds.); ii) "Soybean in tropical and sub-tropical cropping systems", proceedings of a symposium, pp.301–308, Tsukuba, Japan: Fortune Printing Co., Ltd. Taiwan, 1983; and iii) Hanway's article "Foliar fertilization of soybeans during seed-filling", In F. T. Corbin (Ed.) World Soybean Research Conference II: Proceeding, pp.409–416, 1979. These teaching do not teach or suggest using foliar-applied methanol with a nitrogen based fertilizer material at the R5 growth stage of a soybean or seed growth stage in other leguminous plants.

U.S. Pat. No. 4,297,130 entitled "Method For Increasing the Number of Pods in Legumes By Foliar Feeding" by Moore which teaches of a method for the foliar feeding of leguminous plants with a nonburning nitrogenous plant food which is applied to the foliage of the plant at the R1–R4 flowering stage. Again, this teaching does not teach or suggest using foliar-applied methanol with a nitrogen based fertilizer material at the R5 growth stage of a soybean or seed growth stage in other leguminous plants.

Moreover, the effect of foliar application of nitrogen fertilizer alone at various stages of growth on soybean plants does not correlate with consistent yields as taught by Ashour et al. article "Effect of soil and foliar application of nitrogen during pod development on the yield of soybean (Glycine max (L.) Merr. )", Field Crops Research, 6, pp.261–266, 1983. Vasilas et al.'s article "Foliar fertilization of soybeans-:absorption and translocations of 15 N-labeled urea" Agron J , 72–271–275, 1980, reported a response to the nitrogen fertilization in 1 of 2 years. Syvrud et al.'s article "Foliar fertilization of soybeans (Glycine max L)" in Commun. Soil. Sci. Plant Anal. 11: 637–651, 1980, reported a response to foliar applied nitrogen but little effect from a NPKS combinations, i.e. nitrogen-phosphorous-potassium-sulpher fertilization combination. From no response as discussed in Boote et al.'s article "Effect of foliar fertilization on photosynthesis, leaf nutrition and yield of soybeans", Agron. J. 70:787–791,1978, to even yield reduction as discussed in Parker et al.'s article "Foliar injury, nutrient intake and yield of soybeans as influenced by foliar fertilization", Agron. J. 72:110–113, 1979, in soybean has also been observed due to leaf burn or damage from foliar fertilization.

To date, no work has been reported on the effect of foliar-applied methanol and nitrogen on leguminous plants in general and soybeans in particular at the critical seed growth stage for improved seed yield. Thus, the present invention provides such a method.

SUMMARY OF THE INVENTION

The invention is a method of foliar application of methanol and nitrogen at the seed growth stage of leguminous plants and at the R5 growth stage of soybeans (Glycine max (L.) Merr. ) in particular. Verification of the method is provided by test conducted at two locations on the Eastern Shore, Maryland to show the results of the invention's method. A randomized complete block design (RCBD) with 4 blocks in a split-plot arrangement was used with three levels of nitrogen, 0($N_0$), 25($N_1$), 50($N_2$) Kg ha$^{-1}$ as main plots and 3 rates of methanol, 0($M_0$), 125($M_1$), 250($M_2$) L ha$^{-1}$ as sub-plots. Methanol and nitrogen as main effects and their interaction influenced plant growth and yield significantly. M1 treatment increased seed yield by 32% and 16% at UMES and Poplar Hill respectively over the control ($M_0$). Although $N_2$ also gave consistently significantly higher yield as compared to the control ($N_0$) at both locations, $N_1$ produced significantly higher yield only at Poplar Hill However, foliar-applied methanol @ 125 L ha$^{-1}$, and 25 kg nitrogen ha$^{-1}$ ($M_1N_1$) increased yield ha$^{-1}$ by 0.6 ton (30%) at one location and 1.62 tons (75%) at the other over the control ($M_0N_0$). $M_2N_2$ increased the actual seed protein percentage by 3.9 and 2.2 over the control at UMES and Poplar Hill respectively.

DETAILED DESCRIPTION OF THE INVENTION

Two field tests were conducted at the University of Maryland Eastern Shore, Agriculture Research and Education Center (UMES) and at Poplar Hill, Agricultural Experiment Station. The two locations are about 40 km apart. The preceding crop was maize (Zea mays) at each location. Soil analyses are given in (Table 1).

TABLE 1

Physical and Chemical Soil Analyses of Research Plots.

| | LOCATIONS | | | |
|---|---|---|---|---|
| | UMES | | POPLAR HILL | |
| Soil | Soil Depth (cm) | | | |
| Characteristics | 0–15 | 15–30 | 0–15 | 15–30 |
| Soil Texture | SL+ | SL | SL | L |
| Organic Matter (%) | 2.2 | 1.6 | 2.0 | 0.9 |
| pH | 5.6 | 6.3 | 5.9 | 5.3 |
| Mg (kg/ha) | 195H | 288H | 194H | 227H |
| $P_2O_5$ (Kg/ha) | 128H | 112M | 212H | 46$L_1$ |
| $K_2O$ (Kg/ha) | 186H | 111H | 374VH | 293H |
| $NO_3$ (Kg/ha) | 3.8VL | 1.8VL | 4.0VL | 1.1VL |

+SL = Sandy Loam, L = Loamy, VH = Very High, H = High, M = Medium, $L_1$ = Low, VL = Very Low Soil type is sassafras sandy loam (Alfic Normudults, fine loamy, siliceous, mesic) at UMES and Galestown sandy loam (Psammentic Hapludults, sandy, siliceous, mesic) at Poplar Hill. Rainfall distribution is given in (Table 2).

TABLE 2

Monthly mean rainfall for growing season at UMES and Poplar Hill

| | Location | |
|---|---|---|
| | UMES | Poplar Hill |
| Month | mm | |
| May | 159 | 132 |
| June | 32 | 48 |
| July | 40 | 11 |
| August | 113 | 117 |
| September | 111 | 18 |
| TOTAL | 445 | 326 |

Plots were mechanically seeded with row drill planter, rows being 75 cm apart, with 'Corsica' (Maturity Group IV). Plot size was 6.33×3.00 m containing 4 soybean rows. Seeding rate was 27 seed m$^{-1}$ of row. Planting depth was 3 cm. Before planting, 30 kg phosphorous and 80 kg potassium ha$^{-1}$ were mechanically incorporated in the soil. The experiment was in RCBD with four blocks in a split-plot arrangement. Three nitrogen (N) levels, $N_0$=(water only), $N_1$=25 kg and $N_2$=50 kg nitrogen from urea with 500 L water ha-1. were the main plots. These were applied at R5 as foliar spray using hand knapsack sprayers (type: solo sprayer with E04-80 nozzle). Three concentrations of methanol, $M_0$=water only, $M_1$=25% (125 L methanol+375 L water) and $M_2$=50% (250 L methanol+250 L water) $ha^{-1}$ were applied in the subplots as foliar spray immediately after the nitrogen application using the same sprayer and nozzle. Latron B-1956 surfactant was dissolved in water with methanol and urea. Half liter of latron was used for 500 L of water. Foliar applications of nitrogen and methanol were made. The foliar applications began at about 1000 h and ended before 1400 h. Pre-emergence herbicide, metolachlor and linuron, each @ 1.6 L $ha^{-1}$ was applied. In addition, a post emergence herbicide, imazethapyr, was also applied @ 1.68 L $ha^{-1}$ at the 1st trifoliolate stage. Plots at both locations were hand-weeded when necessary. No irrigation was applied at both locations.

Yield was determined by harvesting 1.33 m row from one of the two inner experimental rows in each sub-plot, representing an harvest area of 1 $m^2$ while other characteristics were determined from a random sample of 10 plants from each treatment. Chemical analysis for seed protein and oil was done at the National Center for Agriculture Utilization Research/USDA, at Peoria, Ill. (A.O.A.C. 1975). Results were analyzed statistically using (SAS) General linear model procedure, see Helwig et al in "SAS User's Guide", SAS Institute,Inc., Cary, N.C., 1979. The significance of differences between treatment parameters were evaluated by ANOVA (main effects and interactions). Effects found significant were further tested by least significant difference at a probability of 5%.

Plant growth, yield and seed protein as indicated by ANOVA test were significantly influenced by foliar spray of methanol, and nitrogen (main effects) and their interaction. Foliar application of methanol, averaged across N treatments, gave significant increases in seed yield at both locations (Table 3).

without any statistical significance at both locations. Soybean yield was higher at UMES as compared to Poplar Hill. This may be due to late planting, fertility status and moisture stress. Poplar Hill soil had lower subsoil organic matter content, pH, and $P_2O_5$ as compared to UMES location (Table 1). Rainfall during growing period from May to September at UMES was 445 m and at Poplar Hill 326 mm. Soybean crop at Poplar Hill received 119 mm less rainfall. There was a severe moisture stress in July especially at Poplar Hill (Table 2)

Yield components such as number of pods and seed yield per plant, and 100 seed weight also were significantly increased by methanol application at both locations. $M_1$ always gave the highest value which was significantly different from $M_0$ but not from $M_2$ except number of pods per plant at Poplar Hill. These results are in agreement with the seed yield $ha^{-1}$ obtained from $M_1$ treatment. However, other plant parameters such as plant height, and plant density were not significantly influenced by methanol application (Table 3).

Methanol application had a positive influence in increasing seed protein content. $M_2$, averaged across nitrogen treatments, increased seed protein significantly as compared to $M_0$. Highest protein content were observed with $M_2$ treatment at both locations. The highest protein value of 44 was observed at UMES and 41.2% at Poplar Hill. $M_2$ increased seed protein percentage by 1 at UMES and 0.8% at Poplar Hill locations as compared to the control. $M_1$ did not significantly increase protein content over $M_0$ at either location.

The effect of foliar application of nitrogen on soybean yield is not consistent. Some researchers as discussed above, have observed yield increases while others have not. In the instant invention, the seed yield increased significantly at both locations with foliar fertilization of nitrogen (Table 4). The highest level of nitrogen, $N_2$ (50 kg N $ha^{-1}$), averaged

TABLE 3

Plant growth and yield of Corsica soybean as affected by foliar-applied methanol, averaged across three N treatments.

| Treatment Methanol $ha^{-1}$ L | Seed Yield $ha^{-1}$ t | Seed Yield $Plant^{-1}$ g | Pods $Plant^{-1}$ no | Plant Height cm | 100-seed weight g | Plant Density $m^{-2}$ | Protein % | Oil % |
|---|---|---|---|---|---|---|---|---|
| UMES Location | | | | | | | | |
| 0+ | 2.75 | 12.92 | 45.3 | 56.1 | 14.62 | 26.5 | 43.0 | 20.4 |
| 125 | 3.62 | 16.65 | 61.8 | 55.8 | 15.99 | 26.2 | 43.4 | 20.6 |
| 250 | 3.41 | 16.41 | 58.3 | 59.2 | 15.33 | 25.7 | 44.0 | 19.6 |
| LSD (0.05) | 0.24 | 1.16 | 5.12 | n.s. | 0.85 | n.s. | 0.8 | 0.9 |
| C.V. (%) | 8.73 | 8.78 | 10.9 | 7.8 | 6.45 | 11.9 | 0.8 | 2.5 |
| POPLAR HILL LOCATION | | | | | | | | |
| 0 | 2.23 | 6.86 | 25.3 | 50.2 | 13.89 | 30.2 | 40.6 | 21.9 |
| 125 | 2.58 | 8.95 | 33.3 | 48.9 | 14.92 | 33.1 | 40.9 | 21.2 |
| 250 | 2.49 | 8.92 | 30.6 | 49.6 | 14.82 | 33.8 | 41.2 | 21.3 |
| LSD (0.05) | 0.13 | 0.64 | 2.4 | n.s. | 0.36 | n.s. | 0.4 | 0.6 |
| C.V. (%) | 6.18 | 9.02 | 9.3 | 4.2 | 2.85 | 13.9 | 0.4 | 1.8 |

+0, 125 and 250 L methanol $ha^{-1}$ represent $M_0$, $M_1$ and $M_2$ treatments respectively.

The lowest yield $ha^{-1}$ was obtained from $M_0$, the treatment where only water was sprayed at both locations. $M_1$ gave the highest yield which represented an increase of 32% at UMES and 16% at Poplar Hill over $M_0$ treatment. $M_2$ also gave higher yield than $M_0$. Yield of $M_2$ was lower than $M_1$ across methanol treatments gave higher yield as compared to $N_0$ and $N_1$ at both locations. $N_1$ produced higher yield than $N_0$ only at the Poplar Hill location and not at UMES. We observed the same trend for number of pods and seed yield per plant. As the rate of foliar application of nitrogen increased, the seed yield and pods/per plant also increased at both locations (Table 4). Plant height, and 100 seed weight were not significantly influenced by foliar application of nitrogen.

At both locations we observed that foliar application of nitrogen generally increased protein content of the seed. The significant increase in protein content was obtained with $N_1$ and $N_2$ at UMES. At Poplar Hill, $N_1$ gave significantly higher protein content than $N_0$. There were no differences in protein content between $N_0$ and $N_2$. This again may be due to the moisture stress. Higher nitrogen did not help when water was a limiting factor.

interaction between methanol and nitrogen on the number of pods and seed yield per plant, and 100 seed wt. which had similar trends at both sites.

TABLE 4

Plant growth and yield of Corsica soybean as affected by foliar-applied urea, averaged across three methanol treatments.

| Treatment $N$ $ha^{-1}$ kg | Seed Yield $ha^{-1}$ t | Seed Yield $Plant^{-1}$ g | Pods $Plant^{-1}$ no. | Plant Height cm | 100-seed weight g | Plant Density $m^{-2}$ | Protein % | Oil % |
|---|---|---|---|---|---|---|---|---|
| $0^1$ | 3.10 | 13.32 | 49.5 | 56.0 | 14.79 | 26.2 | 42.3 | 20.8 |
| 25 | 3.17 | 14.91 | 54.1 | 57.2 | 15.03 | 25.8 | 43.3 | 20.6 |
| 50 | 3.49 | 17.74 | 61.8 | 58.0 | 16.11 | 26.4 | 44.9 | 19.1 |
| L.S.D. 5% | 0.26 | 4.03 | 7.5 | n.s. | n.s. | n.s. | 0.4 | 0.5 |
| C.V. | 8.73 | 8.78 | 10.9 | 7.8 | 6.45 | 11.9 | 0.8 | 2.5 |
| POPLAR HILL LOCATION | | | | | | | | |
| 0 | 2.21 | 6.83 | 26.0 | 50.8 | 14.44 | 32.9 | 40.0 | 21.6 |
| 25 | 2.45 | 7.98 | 31.3 | 50.2 | 14.78 | 33.3 | 40.9 | 21.5 |
| 50 | 2.63 | 9.92 | 32.0 | 49.7 | 14.41 | 30.8 | 40.0 | 21.2 |
| L.S.D. 5% | 0.18 | 1.88 | 2.8 | n.s. | n.s. | n.s. | 0.1 | 0.12 |
| C.V. | 6.18 | 9.02 | 9.3 | 4.2 | 2.85 | 13.9 | 0.38 | 1.8 |

[1]0, 25 and 50 kg N $ha^{-1}$ represent $N_0$, $N_1$ and $N_2$ treatments respectively.

Interactions between methanol and nitrogen had significant effects on yield $ha^{-1}$, seed yield per plant, pods per plant, 100 seed wt., and protein content at both locations (Table 5). The highest seed yield $ha^{-1}$ was obtained from

TABLE 5

Interactive effect of methanol and nitrogen on plant growth, yield, and protein content of Corsica soybean.

| | Seed Yield Ha.$^{-1}$ (ton) | | | Seed Yield plant$^{-1}$ (g) | | | Pods plant$^{-1}$ | | | 100-Seed Weight | | | Protein Seed Content (%) | | |
|---|---|---|---|---|---|---|---|---|---|---|---|---|---|---|---|
| | $M_0^+$ | $M_1$ | $M_2$ | $M_0$ | $M_1$ | $M_2$ | $M_0$ | $M_1$ | $M_2$ | $M_0$ | $M_1$ | $M_2$ | $M_0$ | $M_1$ | $M_2$ |
| | | | | | | | UMES LOCATION | | | | | | | | |
| $N_0^\dagger$ | 2.16 | 3.66 | 3.03 | 10.04 | 13.84 | 16.09 | 36.8 | 55.5 | 56.1 | 13.08 | 16.51 | 14.77 | 42.0 | 42.5 | 42.5 |
| $N_1$ | 2.67 | 3.78 | 3.09 | 13.33 | 17.84 | 13.57 | 48.6 | 64.7 | 49.1 | 14.34 | 16.00 | 14.75 | 43.0 | 43.1 | 43.7 |
| $N_2$ | 2.96 | 3.41 | 4.11 | 15.38 | 18.28 | 19.57 | 50.4 | 65.2 | 69.8 | 16.43 | 15.45 | 16.48 | 44.0 | 44.7 | 45.9 |
| LSD 5% | | 0.42 | | | 2.00 | | | 9.0 | | | 1.47 | | | 2.1 | |
| C.V. | | 8.73 | | | 8.79 | | | 10.9 | | | 6.46 | | | 0.8 | |
| $N_0$ | 2.01 | 2.42 | 2.19 | 5.66 | 7.69 | 7.14 | 21.3 | 29.8 | 27.0 | 13.91 | 15.04 | 14.38 | 39.8 | 40.1 | 40.5 |
| $N_1$ | 2.24 | 2.61 | 2.52 | 7.01 | 8.93 | 7.99 | 27.0 | 38.2 | 28.7 | 14.26 | 15.48 | 14.61 | 40.6 | 41.0 | 41.2 |
| $N_2$ | 2.44 | 2.76 | 2.87 | 7.90 | 10.23 | 11.63 | 27.8 | 32.8 | 36.2 | 13.51 | 14.24 | 15.47 | 41.4 | 41.6 | 42.0 |
| LSD 5% | | 0.33 | | | 0.58 | | | 4.1 | | | 0.62 | | | 0.5 | |
| C.V. | | 6.18 | | | 9.02 | | | 9.3 | | | 2.85 | | | 0.4 | |

+$M_0$, $M_1$ and $M_2$ represent 0, 125 and 250 L methanol $ha^{-1}$ respectively.
†$N_0$, $N_1$ and $N_2$ represent 0, 25 and 50 Kg N $ha^{-1}$ respectively.

foliar treatment with $M_2N_2$ at both locations but this yield was not significantly different from $M_1N_1$. $M_1N_1$ produced significantly higher yield, 75% and 30% more than $M_0N_0$ at UMES and Poplar Hill, respectively. This increase in seed yield $ha^{-1}$ was due to the positive significant effects of the Highest protein content values were obtained from M2N2 treatment at both locations. This indicates that seed protein content are positively influenced by increased levels of methanol and nitrogen application. The highest rate of methanol and nitrogen ($M_2N_2$) increased the actual seed protein percentage by 3.9 and 2.2 over the control ($M_0N_0$) at UMES and Poplar Hill respectively. The effect of different levels of methanol and nitrogen on the association between some soybean traits was evaluated (Table 6).

TABLE 6

Correlation Coefficients between some soybean parameters as affected by foliar spray of methanol and nitrogen.

| Trait | 100-seed weight | Seed yield plant$^{-1}$ | Seed yield ha$^{-1}$ |
|---|---|---|---|
| Pods plant$^{-1}$ | 0.484**[1/] (0.394*) | 0.806** (0.733**) | 0.573** (0.670**) |
| 100-seed weight | — | 0.521** (0.272*) | 0.591** (0.394*) |
| Seed yield plant$^{-1}$ | — | — | 0.558** (0.747**) |

[1/]r values without parenthesis are from UMES data and with parenthesis from Poplar Hill.

It was observed that number of pods per plant was significantly correlated with 100 seed wt., seed yield per plant and seed yield ha$^{-1}$ at both locations. The positive association between the number of pods per plant and 100 seed wt. may be due to increased photosynthate accumulation in the seed under the influence of foliar application of methanol and nitrogen. It has been reported that foliar application of methanol increased photosynthetic rate of cotton leaves for a longer period and may have a long term effect on productivity. Increase in seed size (100 seed wt. ) was correlated with seed yield per plant and seed yield/ha at both locations. Seed yield per plant was significantly correlated with seed yield ha$^{-1}$ at both locations. This association is natural since the other two yield components, number of pods per plant and 100 seed wt. were significantly correlated with seed yield per plant.

From 1970 to 1991, the average improvement in soybean yield has then about 1.3% annually as reported in *Soy Bean Bluebook,* 1992 and U.S. Soybean Yield By State, Soyatech, Inc. Bar Harbor, Me. p. 183 1992. Through use of the invention's method of foliar application of methanol and nitrogen, soybean yield can be increased from 30% to 75%. The above disclosure evinces that foliar applications of methanol and urea as a source of nitrogen at a pod filling stage increases yield and main yield components. Even though the highest yield was obtained from $M_2N_2$, this yield was not significantly different from $M_1N_1$. This indicates that use of an $M_1N_1$ treatment increases soybean yield.

The above described method can be used for increasing yields from other leguminous plants, i.e. peanuts, beans, or peas. Application to these other plants would be made at the seed growth stage of their respective plant growth development. In all cases, the method should be used in fair weather periods without rain for effective results. Spraying of soy beans and other leguminous plants would preferably apply methanol first and then within the same day apply nitrogen using a urea based fertilizer. Moreover, the methonal and nitrogen in a urea based fertilizer can be in a single water based solution for a single application.

I claim:

1. A method for increasing seed yield from a leguminous plant consisting of the steps of:

applying to leguminous plant foliage at a seed growth stage within a developed seed pod of the leguminous plant an aqueous solution consisting essentially of methanol that is up to 50% by volume in a water based solution, and applying a corresponding unreacted urea fertilizer to the leguminous plant that is in a range of about 25–50 pounds/acre, whereby the seed yield at maturity has i) increased weight per seed, ii) more seeds per pod of the plant and iii) a greater protein content per seed.

2. The method of claim 1 wherein the leguminous plant is a peanut plant.

3. The method of claim 1 wherein the leguminous plant is a bean plant.

4. The method of claim 1 wherein the leguminous plant is a pea plant.

5. The method of claim 1 wherein the leguminous plant is a soybean plant and the seed development stage is R5.

6. The method of claim 5 wherein the aqueous solution of methanol is about 25% by volume in the water based solution and the urea based fertilizer is abut 25 pounds per acre.

7. A method for increasing seed yield from a soybean plant consisting essentially of the steps of:

applying to the soybean plant's foliage an aqueous solution consisting of methanol that is up to 50% by volume in a water based solution, and applying a corresponding unreacted urea fertilizer to the soybean plant that is up to 50 pounds per acre, whereby the seed yield at maturity has i) increased weight per seed, ii) more seeds per pod of the plant and iii) a greater protein content per seed.

8. The method of claim 7 wherein the methanol and unreacted urea are applied to the soybean plant at an R5 growth stage.

9. A method for increasing seed yield from a soybean plant consisting essentially of the steps of:

applying to the soybean plant's foliage at an R5 growth stage of the soybean plant an aqueous solution comprising methanol that is up to 50% by volume in a water based solution, and applying a corresponding unreacted urea fertilizer to the soybean plant that is up to 50 pounds per acre, whereby the seed yield at maturity has i) increased weight per seed, ii) more seeds per pod of the plant and iii) a greater protein content per seed.

\* \* \* \* \*